UNITED STATES PATENT OFFICE.

ARTHUR J. BOOTE AND HENRY G. W. KITTREDGE, OF TOLEDO, OHIO, ASSIGNORS, BY MESNE ASSIGNMENTS, OF ONE-THIRD TO FRANCIS H. STEEL, OF SAME PLACE.

PROCESS OF TREATING HYDROCARBON OILS FOR REMOVING SULFUR COMPOUNDS.

SPECIFICATION forming part of Letters Patent No. 620,882, dated March 14, 1899.

Application filed November 6, 1897. Serial No. 657,661. (No specimens.)

*To all whom it may concern:*

Be it known that we, ARTHUR J. BOOTE and HENRY G. W. KITTREDGE, citizens of the United States, residing at Toledo, in the county of Lucas and State of Ohio, have invented certain new and useful Improvements in Processes of Treating Hydrocarbon Oils to Remove Sulfur Compounds and other Impurities from the Same, of which the following is a specification.

Our invention relates to the treatment of hydrocarbon-oils of the Lima class and distillates therefrom and is for the effectual removal of the impurities contained therein, known technically as "skunk compound," which has sulfur and other equally objectionable elements in combination with the oil. The presence of this compound causes the oil to have a very offensive odor, similar to rotten eggs, and its presence in the burning oils made therefrom is very objectionable, as the products of combustion are of a disagreeable odor and cause the wick to become crusted and the chimney to be clouded. The method used for many years to deodorize distillates of this class is what is known as the "lead-and-sulfur treatment," which consists, in addition to the ordinary sulfuric-acid and caustic treatment, of a further treatment with lead oxid (litharge) dissolved in caustic soda and with flowers of sulfur or other forms of free sulfur. In this treatment the lead solution oxidizes the hydrogen of the sulfur compound, forming water. This destroys the offensive odor of the oil, but leaves the lead of the lead oxid in combination with the sulfur of the oil. The lead is then precipitated as lead sulfid by the addition of the free sulfur. This treatment when properly performed gives the oil a fair odor; but the original sulfur is not removed, but is generally added to by the oil retaining some of the free sulfur used. Besides the above-described method of making a merchantable oil from this class of distillate there are several effective methods which more or less remove the skunk compound; but these all require two distillations to effect their purpose, which is injurious to the quality of the product and increases the cost.

We have discovered that the skunk compound can be broken up and removed and a burning oil of very superior quality manufactured by our process, which consists, essentially, of the following operations: We take such distillate as will make the gravity, fire test, and color desired and treat it first with any of the oxids of lead in alkaline solution that will combine with the sulfur compounds of the oil, preferably plumbate of soda. The way we commonly make the solution is by dissolving litharge in a solution of caustic soda of about 20° Baumé till the solution is saturated. About one-half pound of litharge in solution per barrel of forty-two gallons of oil is the average quantity required. As different distillates require different quantities, the proper amount is determined by adding to a sample of the batch under treatment enough flowers of sulfur to cause the lead to precipitate as sulfid of lead, then testing the oil from which the lead has been precipitated with a solution of lead in soda. The oil if sweet will not show any discoloration when so treated, but if not sweet it will, in which case more lead solution has to be added to the oil and treated until sweet. The metallic oxid is thus brought into combination with the skunk compound; but instead of precipitating by the addition of free sulfur, as has always been done heretofore, we employ any metallic salt of hypochlorous acid, preferably hypochlorite of calcium or the mixture of calcium chlorid and calcium hypochlorite commonly known as "chlorid of lime."

The operations embraced in our treatment are, as usual, carried out in the agitator and can be conducted at ordinary temperatures, though a temperature of from 70° to 100° Fahrenheit is more expeditious. After the treatment is completed the oil is allowed to settle and the impurities are drawn off from the bottom of the agitator. Before adding the chlorid of lime any lead solution not combined with the oil is drawn off and may be used again. We find that by this treatment with the metallic salts of the hypochlorites the metallic oxid previously added acts as a strong oxidizing agent and unites with the sulfur compounds to cause a precipitation of the sulfur and compounds of sulfur made and existing in the oil.

The above treatment may be done previous to the usual acid-and-soda treatment or after, preferably before, as any remains of the first part of the treatment—partially destroyed or broken hydrocarbons—are removed by the strong acid and the result is a clean and pure oil.

While our process is primarily for the treatment of illuminating-oils, it is equally efficient for the desulfurization of the lighter products, such as benzin, naphtha, gasolene, &c.

What we claim, and desire to secure by Letters Patent, is—

1. In the treatment of oils for the removal of sulfur compounds contained therein, the herein-described method of first treating the oil with an alkaline solution of an oxid of lead and then further treating it with a hypochlorite of calcium, and then removing the precipitate.

2. In the treatment of distillates of the hydrocarbon oils of the class described, the herein-described method of submitting the distillate to a process of desulfurization by treating it first with an oxid of lead in alkaline solution and then with chlorid of lime or suitable hypochlorite, removing the precipitate and also submitting the distillate either before or after such treatment to the usual sulfuric-acid-and-soda treatment.

In testimony whereof we affix our signatures in presence of two witnesses.

ARTHUR J. BOOTE.
HENRY G. W. KITTREDGE.

Witnesses:
  GEO. E. KIRK,
  W. T. NETTLETON.